United States Patent [19]

Sodder, Jr. et al.

[11] Patent Number: 4,463,986
[45] Date of Patent: Aug. 7, 1984

[54] ILLUMINATION DEVICE AND METHOD OF USE IN TUNNEL ALIGNMENT

[76] Inventors: George Sodder, Jr., P.O. Box 306, Alloy, W. Va. 25002; Dominick Costa, Box 547, Gauley Bridge, W. Va. 25085

[21] Appl. No.: 328,714

[22] Filed: Dec. 8, 1981

[51] Int. Cl.$^3$ .............................................. E21D 9/00
[52] U.S. Cl. ....................................... 299/1; 248/333; 362/147; 362/191; 362/269
[58] Field of Search ................... 299/1; 362/295, 164, 362/220, 223, 202, 147, 203, 191, 190, 269, 275; 405/259; 356/153, 138, 399; 37/DIG. 1, DIG. 19, DIG. 20; 33/1 DD, 286, 348, 228, 299; 248/333

[56] References Cited

U.S. PATENT DOCUMENTS

| | | | |
|---|---|---|---|
| 812,111 | 2/1906 | Andrews | 248/324 |
| 2,137,881 | 11/1938 | Margulies | 240/103 |
| 2,217,533 | 10/1940 | Wolarsky | 248/333 |
| 2,371,775 | 3/1945 | Pope | 240/10.6 |
| 2,573,703 | 11/1951 | Gardner | 356/138 |
| 3,240,925 | 3/1966 | Paschke et al. | 362/275 X |
| 3,321,248 | 5/1967 | Williamson et al. | 299/1 |
| 3,484,136 | 12/1969 | Colson | 299/1 |
| 3,498,673 | 3/1970 | Ledray et al. | 299/1 |
| 3,512,743 | 5/1970 | Lipscomb | 248/324 |
| 3,517,966 | 6/1970 | Montacie | 299/1 |
| 3,612,700 | 10/1971 | Nelson | 356/153 |
| 3,614,891 | 10/1971 | Nolte | 356/241 X |
| 3,646,553 | 2/1972 | Conkle | 405/259 X |
| 3,755,668 | 8/1973 | Moreschini | 240/54 A |
| 3,873,823 | 3/1975 | Northrup et al. | 362/269 |
| 3,877,171 | 4/1975 | Scoop et al. | 46/228 |
| 4,141,153 | 2/1979 | Nelson | 33/286 |
| 4,238,828 | 12/1980 | Hay | 299/1 X |
| 4,410,933 | 10/1983 | Blake et al. | 248/324 X |

Primary Examiner—Ernest R. Purser
Attorney, Agent, or Firm—Burns, Doane, Swecker & Mathis

[57] ABSTRACT

The present invention relates generally to illumination devices and method of use in tunnel alignment. More particularly, the present invention relates to an illumination device producing a concentrated directional light beam adapted for verifying the center plane of a boring in an underground mine passageway. The illumination device includes a first elongated portion having a longitudinal axis. An arangement for fastening the first portion to a support is provided at a first end of the first portion. A second portion rotatably received by the first portion includes a light source for producing a directional light beam. The light beam is adapted to be directed away from the longitudinal axis of the first portion. An arrangement for retaining the second portion in a predetermined angular position with respect to the axis of the first portion is also provided. In a preferred embodiment, the second portion is telescopically received within the first portion and includes a hinge arrangement which permits pivotal movement of a holder for the light source relative to a segment of the second portion to a location substantially perpendicular to the longitudinal axis of the first portion.

22 Claims, 7 Drawing Figures

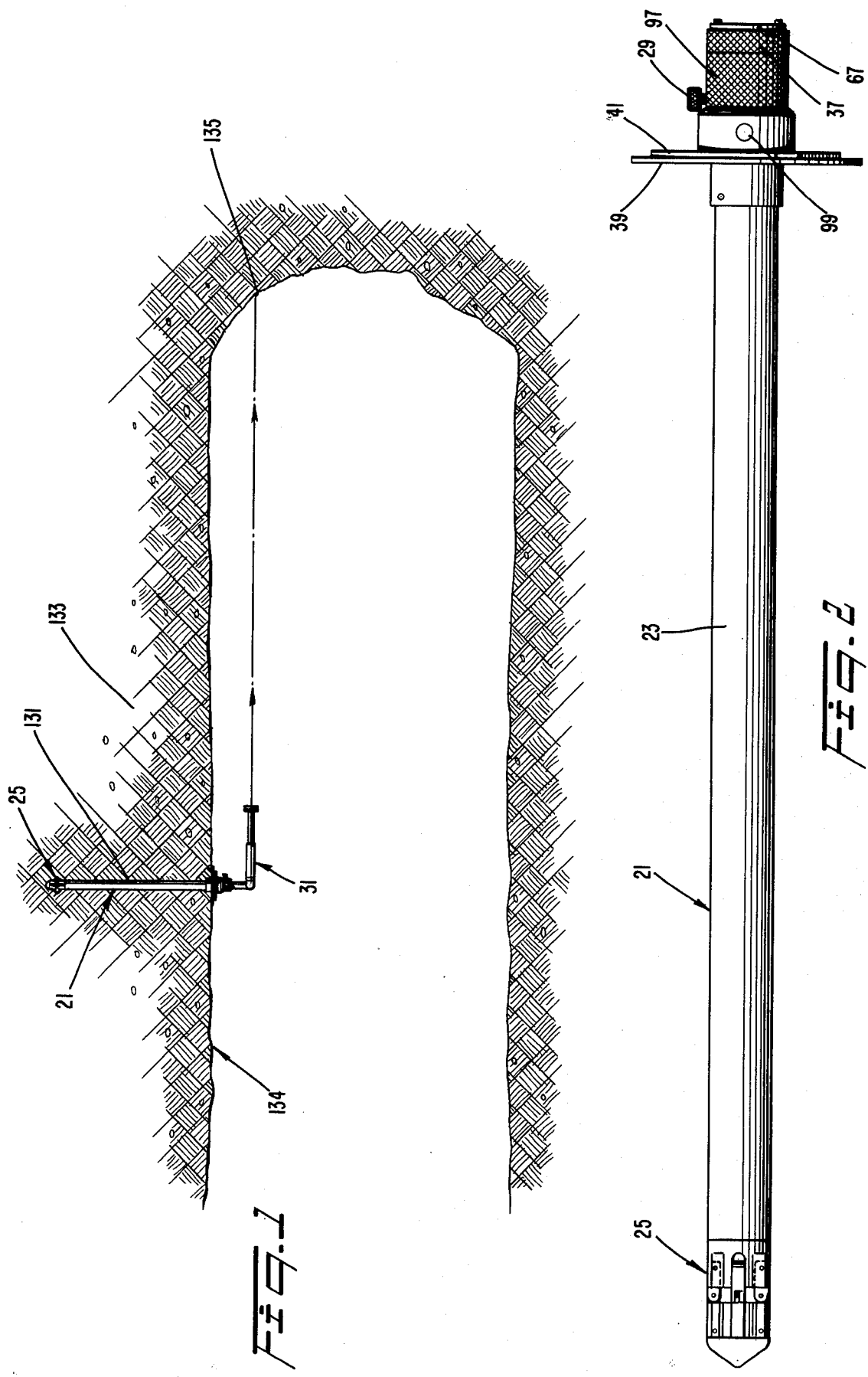

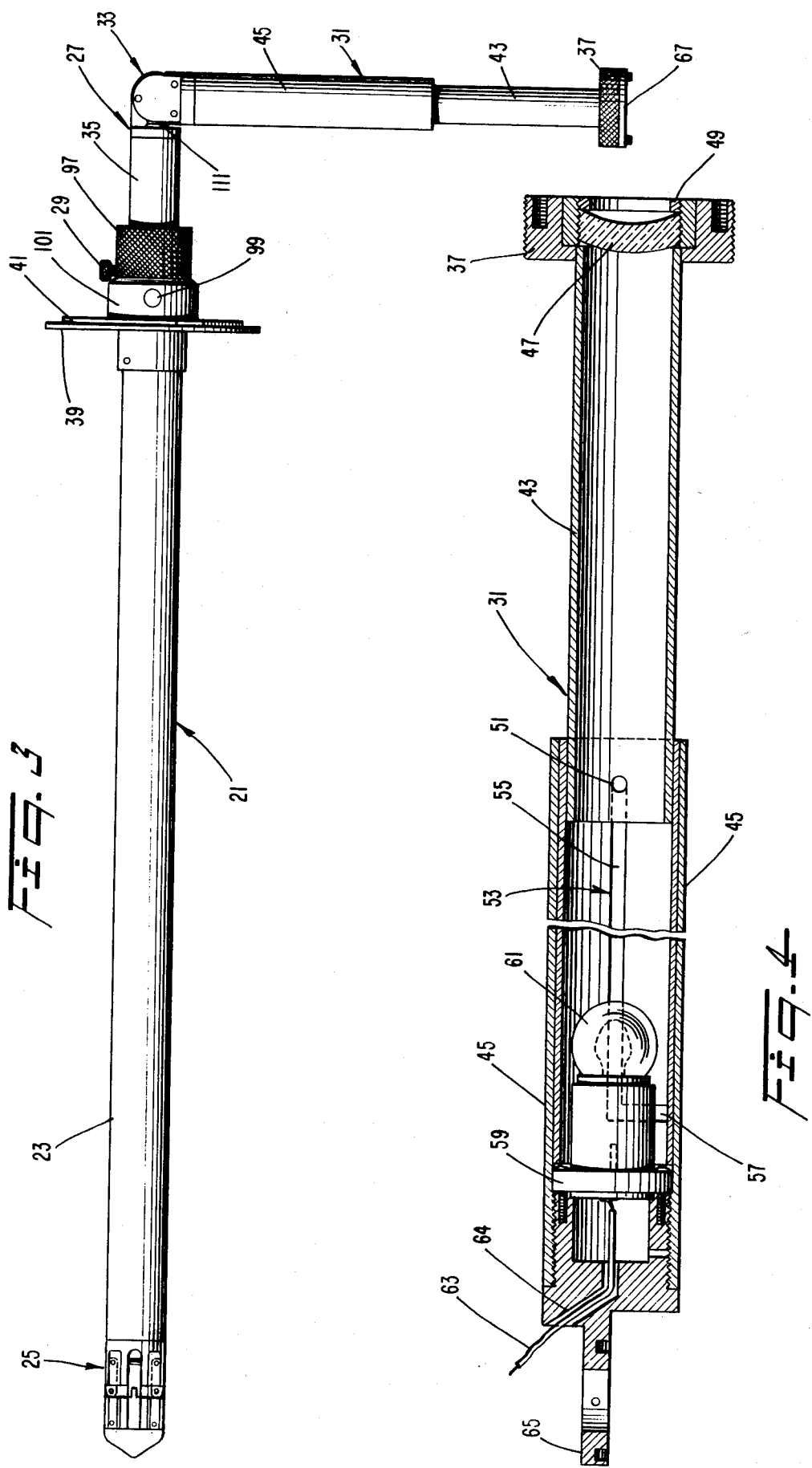

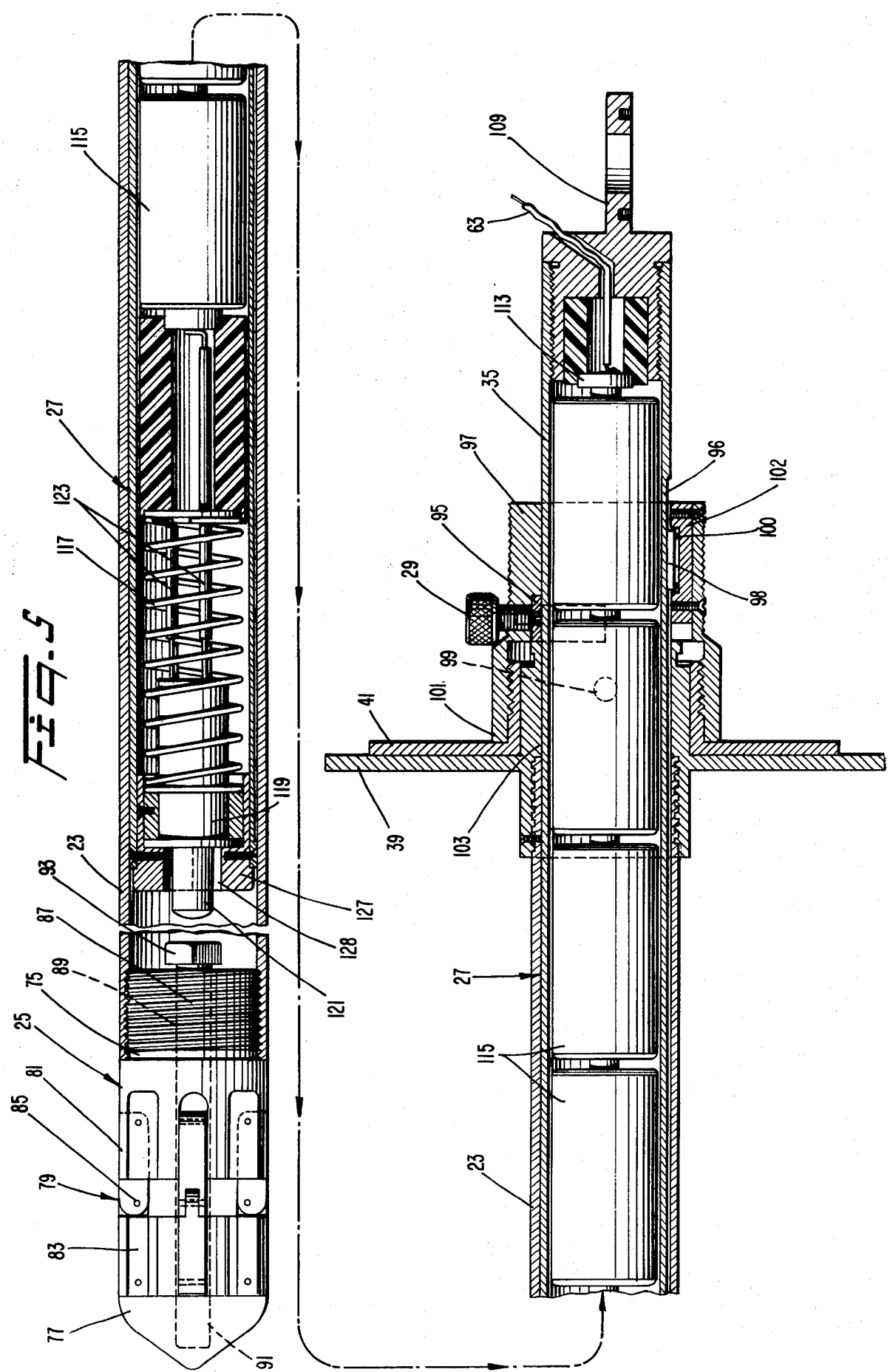

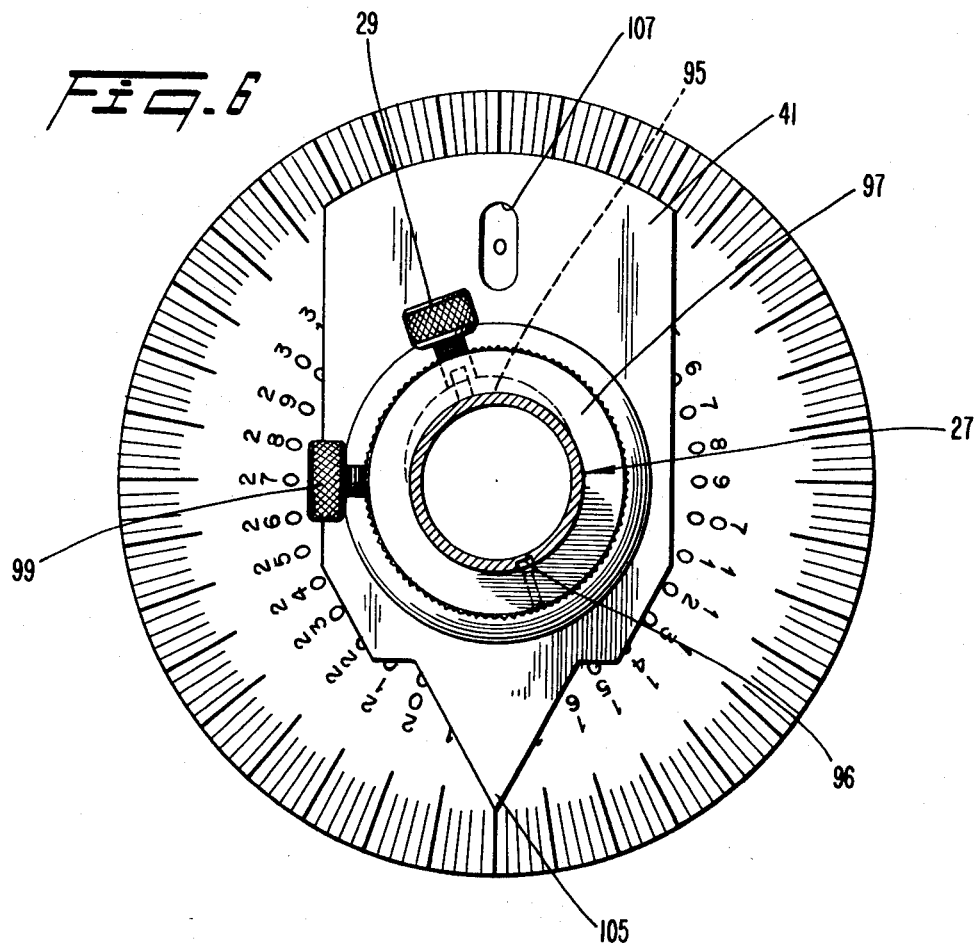
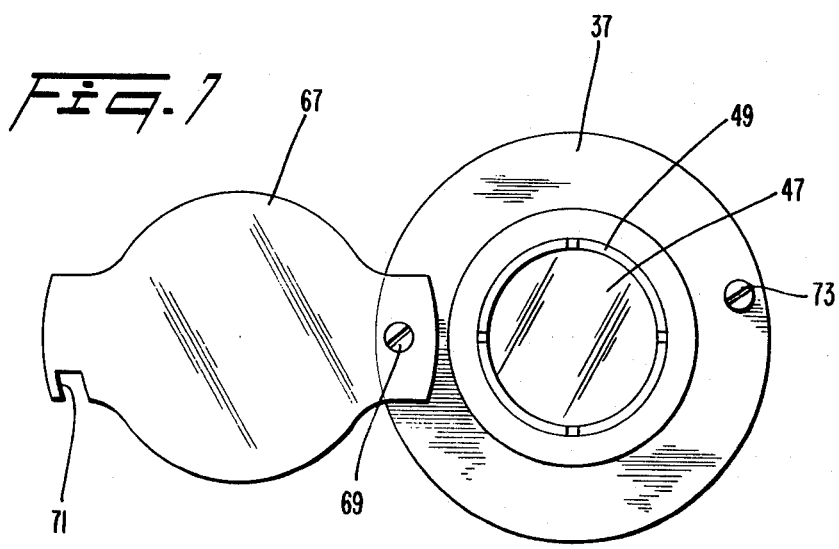

ILLUMINATION DEVICE AND METHOD OF USE IN TUNNEL ALIGNMENT

BACKGROUND AND SUMMARY OF THE PRESENT INVENTION

The present invention relates generally to an illumination device. More particularly, the present invention relates to an illumination device for producing a concentrated directional light beam for use in verifying a center plane of boring, for example, in an underground mine passageway.

During underground mining, it is important to maintain the direction of boring of the mine passageway along a predetermined horizontal path. By maintaining the predetermined path, the mine passageway is more advantageously arranged within the coal or other ore to be mined. In the past, a deviation of several feet per 100 feet of boring is not uncommon. Such a deviation, if permitted to continue, is unacceptable.

One known method of verifying the vertical center plane of the boring includes requiring an engineer/surveyor to arrange appropriate surveying instruments within the bored passageway at periodic intervals to verify the center plane of the passageway. This procedure requires costly time consuming measures to reset the instruments and requires the additional expense of paying the engineer/surveyor's time. Accordingly, such a procedure is neither expeditious nor economical.

Accordingly, it is an object of the present invention to provide a simple and effective method of verifying the center plane of a boring in a mine passageway.

A further object of the present invention is to provide an apparatus which permits the periodic verification of the center plane without requiring the services of an engineer/surveyor.

Still further, it is an object of the present invention to provide a relatively simple illumination device for producing a directional light beam which may be used for verifying the center plane of an underground mine passageway. The illumination device according to the present invention can preferably be left within the passageway to be used for a periodic verification of the center plane without interfering with the mining operations therein.

It is another aspect of the present invention to provide a novel illumination device for producing a directional light beam which may be conveniently secured to a support and used for illuminating a predetermined small area spaced from the support.

These and many other objects are achieved by an illumination device for producing a concentrated directional light beam according to the present invention. The illumination device includes an elongated first portion having a longitudinal axis. A fastening arrangement is provided for securing the first portion to a support structure. A second portion rotatably received by the first portion contains a light source for producing the directional light beam. The light beam is adapted to be directed away from the longitudinal axis of the first portion. An arrangement is provided for retaining the second portion in a predetermined angular position with respect to the longitudinal axis of the first portion.

According to a preferred embodiment, the second portion is telescopically received within the first portion. Upon extension of the second portion, a hinge arrangement is exposed which arrangement permits movement of the light beam produced by the light source from a direction substantially colinear with the longitudinal axis of the first portion to a direction substantially perpendicular to the longitudinal axis. Still further, the second portion may be selectively retained in the position substantially perpendicular to the longitudinal axis of the first portion.

Still further in the preferred embodiment, the fastening arrangement includes an expandable chuck carried by the first portion of the illumination device. The second portion is adapted to interconnect with an actuator for the expandable chuck in a first, closed position of the second portion relative to the first portion. By this arrangement, rotation of the second portion in the first position is operable to expand the chuck and secure the chuck within an opening provided in the support structure. Still further, a switch for energizing the light source is arranged to close when the second portion of the illumination device is moved away from the first position of the second portion. The illumination device also preferably includes a vernier scale secured to the first portion and adapted to indicate the angular position of the second portion relative to the longitudinal axis of the first portion.

In accordance with a method of verifying the center plane of boring an underground mine passageway according to the present invention, a first portion of an illumination device is secured against rotation relative to a wall of a mine passageway. The second portion is rotated generally about a vertical axis until the second portion is secured in a predetermined angular position indicative of the desired center plane. In this way, the light beam is directed against an end wall of the underground mine for indicating the center plane of boring. The location of the light beam upon the end wall is preferably marked such that the boring equipment may be moved into place and aligned with the marking.

According to the preferred method of arranging the second portion at the predetermined angular position, the second portion which is telescopically received within the first portion is extended after securing the first portion relative to the wall. The second portion is subsequently pivoted about an axis perpendicular to the vertical axis before rotating the second portion about the vertical axis.

BRIEF DESCRIPTION OF THE DRAWINGS

Preferred embodiments of a method and apparatus according to the present invention will be described in greater detail with reference to the accompanying drawings, wherein like members bear like reference numerals and wherein:

FIG. 1 is a schematic view of an illumination device according to the present invention arranged within a bore hole in a ceiling of a mine passageway;

FIG. 2 is a schematic view of the illumination device according to the present invention in a first, closed position;

FIG. 3 is a schematic view of the illumination device of FIG. 2 in a second, activated position;

FIG. 4 is a cutaway view of a portion of the device of FIG. 3;

FIG. 5 is a cutaway view of a further portion of the device of FIG. 3;

FIG. 6 is a schematic view of the vernier scale provided on the illumination device according to the present invention; and FIG. 7 is a schematic view of an end of the illuminating device according to the present invention.

DETAILED DESCRIPTION OF THE PREFERRED EMBODIMENTS

With reference to FIG. 2, an illumination device 21 includes a first elongated, generally cylindrical portion 23. An expandable chuck 25 for securing the first portion within a support structure is arranged at a first end of the first portion 23. As illustrated in FIG. 2, the illumination device 21 is in a closed, inoperative position.

With reference to FIG. 3, a second portion 27 is telescopically received within the first portion 23. Upon loosening of a first thumb screw 29 the second portion 27 may be extended from or retracted within the first portion 23. The second portion 27 is rotatable about the longitudinal axis of the first portion. As seen in FIG. 3, the second portion is in an open, activated position. The second portion 27 includes a telescopic holder 31 which is connected at a first end through a hinge arrangement 33 to a segment 35 of the second portion 27. A portion of the segment 35 remains within the first portion 23. A second end of the holder 31 includes a knurled end 37. A vernier scale 39 is secured to the first portion 23 with a pointer 41 rotatably secured against a face of the vernier scale 39 (see also FIG. 6). The vernier scale 39 is provided to ascertain the angular orientation of the second portion 27 relative to the longitudinal axis of the first portion 23.

As best seen in FIG. 6, the pointer 41 includes a point 105 and preferably includes a window 107 through which markings on the vernier scale 39 can be readily ascertained. In this way, if the predetermined angular position is known, the second portion 27 and more particularly the holder 31 and a light source therein can be arranged at the proper angular orientation with respect to the longitudinal axis of the first portion 23 of the illumination device 21 in a quick and efficient manner.

With reference to FIG. 4, the holder 31 includes a first portion 43 telescopically received within a second portion 45. The knurled end 37 is secured to the first portion 43 of the holder 31 and includes a lens 47 secured within the knurled end 37 for focusing light from a light source to produce a concentrated directional light beam. The lens 47 may be secured by any suitable arrangement. A retainer ring 49 is preferably provided to ensure that the lens 47 remains within the first portion 43 of the holder 31 and to prevent dirt and/or moisture from penetrating past the lens into the interior of the holder 31.

The first portion 43 of the holder 31 further includes a pin 51 arranged on a outer circumference of the first portion 43 which pin 51 is adapted to engage a bayonet-type slot 53 within the second portion 45 of the holder 31. The bayonet-type slot 53 includes a longitudinal portion 55 and a second portion 57 arranged at a right angle to the longitudinal portion 55. In this way, when the first holder portion 43 is telescopically slid all the way into the second portion 45, a clockwise rotation of the knurled end 37 of the first portion 43 causes the pin 51 to engage within the right angle portion 57 of the slot 53 to prevent axial movement of the first portion 43 relative to the second portion 45. In addition, for reasons to be explained subsequently, the right angle portion 57 of the bayonet-type slot 53 permits co-rotation of the first and second portions of the holder 31 upon further clockwise rotation of the knurled end 37.

The second portion 45 of the holder 31 includes a supporting arrangement 59 adapted to receive a high intensity lamp 61 serving as a light source. The lamp 61 is connected in a manner to be described subsequently to a source of electrical energy through a wire 63 which passes through a slit 64 in an end of the second portion 45. Due to the relatively small diameter and substantial length of the fully opened holder 31, a straight narrow beam of light is produced which beam is further focused by the lens 47 to produce a concentrated, directional light beam of high intensity emanating from holder 31. The second portion 45 of the holder 31 includes a flange 65 extending axially from the end of the second portion 45 remote from the end receiving the first portion 43 of the holder 31. The flange 65 forms a portion of the hinge arrangement 33 (FIG. 3).

With reference to FIG. 5, a flange 109 arranged at a first end of the segment 35 of the second portion 27 is adapted to cooperate with the flange 65 on the holder 31 to form the hinge arrangement 33. The two flanges 109, 65 are pivotably secured together in a known manner. In addition, as seen in Fig. 3, a spring biased plunger 111 is adapted to cooperate with an external surface of the flange 65 to selectively secure the holder 31 in a position at an angle of substantially 90° with respect to the segment 35 of the second portion 27. In other words, the surface of the plunger 111 engages a surface of the flange 65 to cause sufficient resistance to free pivotal movement of the holder 31 relative to the segment 35 such that the holder 31 remains in the desired position. It should be noted that the force exerted by the plunger 111 is not sufficient to prevent pivotal movement of the holder 31 when actuated by hand.

Again with reference to FIG. 5, also arranged at the first end of the segment 35 is a electrical contact 113 which is attached to the wire segment 63 connected to the holder 59 for the high intensity lamp 61 (FIG. 4). Arranged within the segment 35 are a plurality of batteries 115 serving as an energy source for the high intensity lamp 61. The batteries are biased toward the contact 113 by a spring 117 arranged at a second end of the segment 35.

With further reference to FIG. 5, the expandable chuck 25 includes a first end 75 threadably secured within the first portion 23 of the illumination device 21. A second end 77 of the expandable chuck 25 is interconnected with the first end 75 by a plurality of linkages 79. Each of the linkages 79 includes a first link 81 pivotally connected at one end to the first end 75 and a second link 83 pivotally connected at one end to the second end 77 of the chuck 25. The two links 81, 83 of each linkage 79 are connected to one another at respective second ends about a pivot 85.

A bolt 87 passes through a bore 89 in the first end 75 of the expandable chuck 25 and threadably engages a bore 91 in the second end 77 of the expandable chuck 25. A head 93 of the bolt 87 is arranged at the first end 75. Each of the links 81, 83 is prevented from pivotable movement toward the bolt 87. In this way upon screwing the bolt 87 into the threaded bore 91 of the second end 77, the second end 77 is drawn towards the first end 75 which is secured within the first portion 23 of the illumination device 21. Upon movement of the second end 77 toward the first end 75, the pivotable links 81, 83 cause the pivot points 85 to expand outwardly. The outward expansion of the links 81, 83 causes the links to tightly engage the side walls of a bore in a support structure into which bore the first portion 23 of the illumination device 21 is inserted. In this way, the first portion 23 of the illumination device 21 is held against rotation relative to the support structure and the illumination device 21 is secured to the support structure.

Arranged at the second end of the segment 35 is a pressure actuated switch 119 of a conventional design. The switch 119 preferably includes a spring biased plunger 121 which interrupts the electrical connection through wires 123 when in a depressed condition within the body of the switch 119. In other words, the switch 119 is similar to a switch commonly found in doors of an automobile. The plunger 121 of the switch 119 is arranged within a hexagonal opening 125 within a support 127. The hexagonal opening 125 is adapted to receive the head 93 of the bolt 87 of the expandable chuck 25 in a closed position of the illumination device 21 according to the present invention (FIG. 2). Accordingly, withdrawal of the second portion 27 from the first portion 23 causes the switch plunger 121 to disengage from the bolt head 93 and to extend outwardly thereby permitting the flow of current from the batteries 115 to pass through the wires 123 and ultimately to the lamp 61.

In order to activate the expandable chuck 25, the first thumb screw 29 may be loosened slightly to permit rotation of the second portion 27 relative to the first portion 23 by turning the knurled end 37 of the holder 31 when in the closed position as seen in FIG. 2. It should be noted that since the pin 51 is engaged within the right angle portion 57 of the bayonet-type slot 53, rotation of the knurled end 37 causes rotation of the entire holder 31 and the segment 35 attached thereto through the hinge arrangement 33. Since, in the closed portion, the head 93 of the bolt 87 is engaged within the hexagonal opening 125 at the end of the segment 35, rotation of the knurled end 37 causes the bolt 87 to engage further within the bore 91 to expand the linkages 79. After expanding the chuck 25, the second portion 27 is withdrawn from the first portion 23 by pulling outwardly on the knurled end 37 of the holder 31. The bolt head 93 disengages from the hexagonal opening 125 thereby causing the plunger 121 of the switch 119 to extend outwardly and complete an electrical circuit for activating the high intensity lamp 61. Also, after disengaging from the bolt head 93, further rotation of the second portion 27 does not affect the chuck 25.

As noted previously, the second portion 27 is telescopically received within the first portion 23 of the illumination device 21. The first thumb screw 29 acts through a cresent shaped member 95 which engages an outer surface of the second portion 27 to prevent relative axial movement between the second portion 27 and the first portion 23. In the position of the second portion 27 illustrated in FIG. 5, the crescent-shaped member 95 actually engages the outer peripheral surface of the segment 35. However, it is to be understood that in the closed position (FIG. 2) of the illumination device 21, the member 95 engages the outer surface of the second portion 45 of the holder 31. The first thumb screw 29 is arranged in a knurled portion 97 of an alignment base assembly (unnumbered).

A keyway 96 is also provided along the axis of the segment 35 over a substantial portion of the length of the outer peripheral surface of the segment 35. A key 98 adapted to fit within the keyway 96 is carried by a holder 102 secured to the knurled portion 97. The key 98 is biased by a spring mechanism 100 toward the outer peripheral surface of the segment 35. When the key 98 engages the keyway 96, relative rotation between the knurled portion 97 and the segment 35 is prevented. It should be noted that keyway 96 is arranged such that the key 98 cannot engage the keyway 96 until the hinge arrangement 33 has completely cleared the end of the first portion 23. A second thumb screw 99 is arranged to pass through bores provided in a smooth portion 101 of the alignment base assembly, the pointer 41 and a flange 103 of the alignment base assembly to prevent relative rotation between the pointer 41 which is secured to the knurled portion 97 and the vernier scale 39.

When it is desired to set the angular position of the second portion 27, in particular the holder 31, with regard to the longitudinal axis of the first portion 23, the second portion 27 is rotated until the key 98 engages the keyway 96. The first thumb screw 29 is rotated such that the cresent shaped member 95 engages the outer peripheral surface of the segment 35 to prevent relative axial movement between the second portion 27 and the first portion 23. Thereafter, the second thumb screw 99 is disengaged from the flange 103. In this way, rotation of the knurled portion 97 of the alignment base assembly causes co-rotation of the second portion 27 and the pointer 41 relative to both the first portion 23 and the vernier scale 39 attached thereto. Accordingly, the holder 31 may be set at the proper angular orientation by viewing markings provided on the vernier scale 39. The second thumb screw 99 is then rotated to engage the flange 103 and prevent any further rotational movement of the second portion (including the holder 31) relative to the first portion 23. It should be noted that the second portion 27 can be reinserted into the first portion 23 by loosening the thumb screw 29 and subsequently re-extended without requiring a resetting of the angle of the second portion 27 relative to the first portion 23. The desired angle is retained due to the combined effects of the key 98 and the second thumb screw 99.

With reference to FIG. 7, the knurled end 37 of the holder 31 has a lens cover 67 for protecting the lens 47 when not in use. The lens cover 67 is pivotably secured to the knurled end 37 by a spring-biased screw 69. The lens cover 67 further includes an engagement slot 71 generally opposite the spring-biased screw 69 which slot 71 is adapted to engage a second screw 73 arranged on a side of the knurled end 37 generally opposite the spring-biased screw 69. In this way, pivotal movement of the lens cover 67 in a counterclockwise direction as seen in FIG. 7 causes the slot 71 to engage the screw 73 thereby covering the lens 47. The spring-biased screw 65 maintains engagement between the slot 71 in the lens cover 67 and the second screw 73.

With reference to FIG. 1 and with reference to a preferred use for the illumination device according to the present invention, the illumination device 21 in a closed position with the first thumb screw 29 and the second thumb screw 99 secured is inserted within a roof bolt orifice 131 in a roof 133 of a mine passageway 134 to be bored. The illumination device 21 is inserted within the roof bolt orifice 131 until a back side of the vernier scale 39 abuts the lower side of the roof 133 of the mine passageway 134. At this time, the first thumb screw 29 may be loosened slightly to permit rotation of the second portion 27 relative to the first portion 23 by rotation of the knurled end 37 of the holder 31. As noted previously, rotation of the second portion 27 relative to the first portion 23 when the illumination device 21 is in the closed position causes the bolt 87 to expand the linkages 79 of the chuck 25 due to the engagement of the hexagonal opening 125 with the head 93 of the bolt 87. The expansion of the chuck 25 secures the illumination device 21 within the roof bolt orifice 131.

The first thumb screw 29 is further loosened to permit the second portion 27 to be pulled downwardly from the first portion 23 until the hinge arrangement 33 clears the knurled portion 97 of the alignment base assembly. When the desired axial extension is achieved, the first thumb screw 29 is tightened causing an engagement of the crescent-shaped member 95 with the outer peripheral surface of the segment 35 of the second portion 27 to thereby prevent further axial movement of the second portion 27 relative to the first portion 23. The holder 31 is then pivoted about the hinge arrangement 33 until the spring loaded plunger 111 is effective to lock the holder 31 in a position substantially perpendicular to the segment 35 of the second portion 27.

The proper orientation of the holder 31 relative to the roof bolt orifice 131 is determined using known surveying techniques to establish a vertical center plane of the boring of the mine passageway 134. In other words, by establishing the vertical center plane, deviatons in the boring from left to right are avoided. The thumb screw 29 may be loosened slightly if necessary to permit the holder 31 to be rotated until the spring biased key 98 engages the keyway 96. Thereafter, the first thumb screw 29 is screwed inwardly and the crescent-shaped member 95 engages the appropriate portion of the outer peripheral surface of the segment 35 of the second position 27 to prevent any possibility of unwanted axial movement of the second portion 27. At this time, the second thumb screw 99 is loosened to permit co-rotation of the pointer 41 with the segment 35 of the second portion 27 through the knurled portion 97. Consequently, the holder 31 with the light source 61 arranged therein is also rotated by the rotation of the knurled portion 97 of the alignment base assembly.

By observing the vernier scale 39 particularly through the window 107 provided in the pointer 41, the proper orientation of the light source 61 can be quickly set using the center plane location established by the known surveying techniques. The light beam illuminates a very small area on the wall to indicate a portion of the vertical center plane. The location of the center plane indicated by the directional light beam shining against the end wall of the mine passageway 134 is preferably marked and the illumination device 21 according to the present invention is placed back in the closed position thereby extinguishing the light and placing the illumination device 21 in a position which will not impede further boring. At this point, boring equipment is aligned with the indicated center plane and boring may commence using the marking as a reference for the center plane of the mine passageway 134.

After a predetermined length of the mine passageway has been excavated, the alignment of the boring machine with regard to the desired center plane can be quickly verified by removing the boring machine and re-extending the illumination device 21 according to the present invention. Simple rotation of the second portion 27 until the key 98 engages the keyway 96 automatically realigns the pointer 41 with the proper, predetermined vernier marking. The beam from the light source 61 shines on the end wall of the passageway 134 to verify the accuracy of the boring. At this time, appropriate corrections can be made if necessary. It should be noted that after a certain length of boring, it may be necessary to remove the illumination device 21 and to insert the device in a roof bolt orifice further along the mine passageway 134 to obtain sufficient illumination on the end wall for marking. The proper angular position of the second portion of the illumination device must again be ascertained to indicate the center plane of boring.

It should be noted that the illumination device according to the present invention may be inserted within a horizontal bore in a side wall of the mine passageway 134 to produce a light beam indicative of a horizontal center plane of boring. Also, by extending the second portion 27 from within the first portion 23 until the hinge arrangement 33 is at a location approximately one half the height of the mine (i.e., further downwardly extended than illustrated in FIG. 1), the horizontal center plane will be generally indicated by the light beam assuming that the roof bolt orifice 131 is substantially vertical.

While the invention has been described with particular reference to use of the illumination device in a underground mine, it is to be understood that the illumination device 21 according to the present invention may be used in any arrangement having a support capable of being engaged by the expandable chuck 25 which arrangement requires an accurate and periodic check for proper alignment.

The principles, preferred embodiments, and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. An illumination device for producing a concentrated directional light beam adapted to illuminate very small areas, comprising:
   an elongated first portion having a longitudinal axis;
   fastening means for securing said first portion to a support structure;
   a second portion received by said first portion, said second portion being rotatable about the longitudinal axis;
   said second portion defining an interior area containing light means for producing a directional light beam, means for orienting said light beam along a direction away from said longitudinal axis; and
   means for retaining the second portion in a predetermined angular position with respect to the longitudinal axis of the first portion such that the light beam is directed along a predetermined path to illuminate the small area.

2. The device of claim 1, wherein the fastening means comprises an expandable chuck carried by said first portion.

3. The device of claim 2, further comprising means for interconnecting the second portion with an actuator for the expandable chuck in a first position of the second portion, rotation of the second portion in the first position being operable to expand the chuck.

4. The device of claim 1, further including switch means for energizing said light means, said switch means being operable to energize said light means when the second portion is moved away from a first position and being operable to de-energize said light means when the second portion is in the first position.

5. The device of claim 1, wherein the second portion is telescopically received within the first portion.

6. The device of claim 1, wherein the second portion includes hinge means for permitting movement of the light means from a location in which the light beam is substantially colinear with the longitudinal axis to a location in which the light beam is substantially perpendicular to the longitudinal axis.

7. The device of claim 6, further including means for selectively retaining the light means in the location in which the light beam is substantially perpendicular to the longitudinal axis.

8. The device of claim 1 or 6, wherein the light means includes a high intensity lamp arranged at a first end of a narrow elongated member, and a lens for focusing the light from the lamp arranged at a second end of the elongated member.

9. The device of claim 1, wherein the support structure comprises a wall of an underground mine, the first portion of the light being adapted to be inserted into a bore in the wall, and said fastening means includes an expandable chuck carried by said first portion.

10. The device of claim 1, further including a vernier scale and a rotatable indicator for indicating the angular position of the second portion relative to the first portion.

11. The device of claim 10, wherein the means for retaining the second portion in the predetermined angular position includes a thumb screw for preventing movement of the indicator relative to the vernier scale and a key engagable with a keyway provided on a portion of the outer peripheral surface of the second portion.

12. A method of verifying a vertical center plane of boring an underground mine passageway, comprising the steps of:
   securing a first portion of an illumination device against rotation relative to a wall of the passageway;
   rotating a second portion of the illumination device containing a light source for producing a concentrated directional light beam, said second portion being rotatable in a direction substantially about a vertical axis;
   pivoting the second portion about an axis perpendicular to the longitudinal axis of the first portion; and
   securing the vertical portion in a predetermined angular position relative to the vertical axis indicative of the desired center plane such that the light beam shines at an end wall of the passageway to indicate the center plane of boring.

13. The method of claim 12, further comprising the step of marking the location of the light beam on the end wall.

14. A method of verifying a center plane of boring an underground mine passageway, comprising the steps of:
   inserting an elongated first portion of an illumination device in a hole, in a wall of the passageway;
   securing the first portion against rotation relative to the walls;
   rotating a second portion of the illumination device containing a light source for producing a concentrated directional lightning, said second portion being rotatable in a direction substantially about a longitudinal axis of the first portion;
   pivoting the second portion about an axis perpendicular to the longitudinal axis of the first portion; and
   securing the second portion in a predetermined angular position relative to the longitudinal axis indicative of the desired center plane such that the light beam shines at an end wall for the passageway to indicate the center plane of the boring.

15. The method of claim 14, further comprising the step of marking the location of the light beam on the end wall.

16. The method of claim 14, wherein the step of securing the first portion comprises expanding a chuck carried by the first portion after inserting the first portion in the hole.

17. The method of claim 16, wherein the step of expanding the chuck comprises rotating the second portion about a longitudinal axis of the first portion in a first position of the second portion.

18. The method of claim 14, further comprising the steps of:
   extending the second portion which is telescopically received within the first portion after securing the first portion; and
   pivoting the second portion about an axis perpendicular to the longitudinal axis of the first portion prior to rotating the second portion about the longitudinal axis of the first portion.

19. The method of claim 18, further comprising the steps of:
   retaining the value of the predetermined angular position after returning the second portion within the first portion; and
   re-extending the second portion to again indicate the center plane of boring.

20. The method of claim 18, further comprising the steps of:
   returning the second portion telescopically within the first portion;
   automatically extinguishing the light source when the second portion is returned within the first portion;
   retaining the value of the predetermined angular position during the returning of the second portion;
   aligning boring equipment provided in the passageway with the indicated center plane of boring;
   boring a length of the mine passageway;
   moving the boring equipment away from an end of the bored length;
   re-extending the second portion from within the first portion to automatically activate the light source;
   returning the second portion to the retained predetermined angular position;
   indicating the desired center plane of boring; and
   verifying the accuracy of the bored length of the passageway.

21. The method of claim 14, wherein the hole is a roof bolt orifice provided in the ceiling of the mine passageway.

22. An illumination device for producing a concentrated directional light beam adapted to illuminate various small areas, comprising:
   an elongated first portion having a longitudinal axis;
   an expandable chuck carried by said first portion for securing said first portion in an opening in a support structure adapted to receive the first portion;
   a second portion telescopically received within said first portion, said second portion being rotatable about the longitudinal axis;

said second portion defining an interior area which contains a light source for producing a directional light beam;

said second portion includes hinge means for permitting movement of the second portion from a first to a second position, the light beam being directed in a direction substantially colinear with the longitudinal axis in the first position and in a direction substantially perpendicular to the longitudinal axis in a second position;

means for selectively retaining the second portion in the second position; and means for retaining the second portion in a predetermined angular position with respect to the longitudinal axis of the first portion such that the light beam is directed along a predetermined path to illuminate the small area.

* * * * *